No. 708,018. Patented Sept. 2, 1902.
R. BROWN.
UTILIZING WASTE HEAT IN CONNECTION WITH SMELTING FURNACES.
(Application filed Apr. 12, 1902.)
(No Model.)
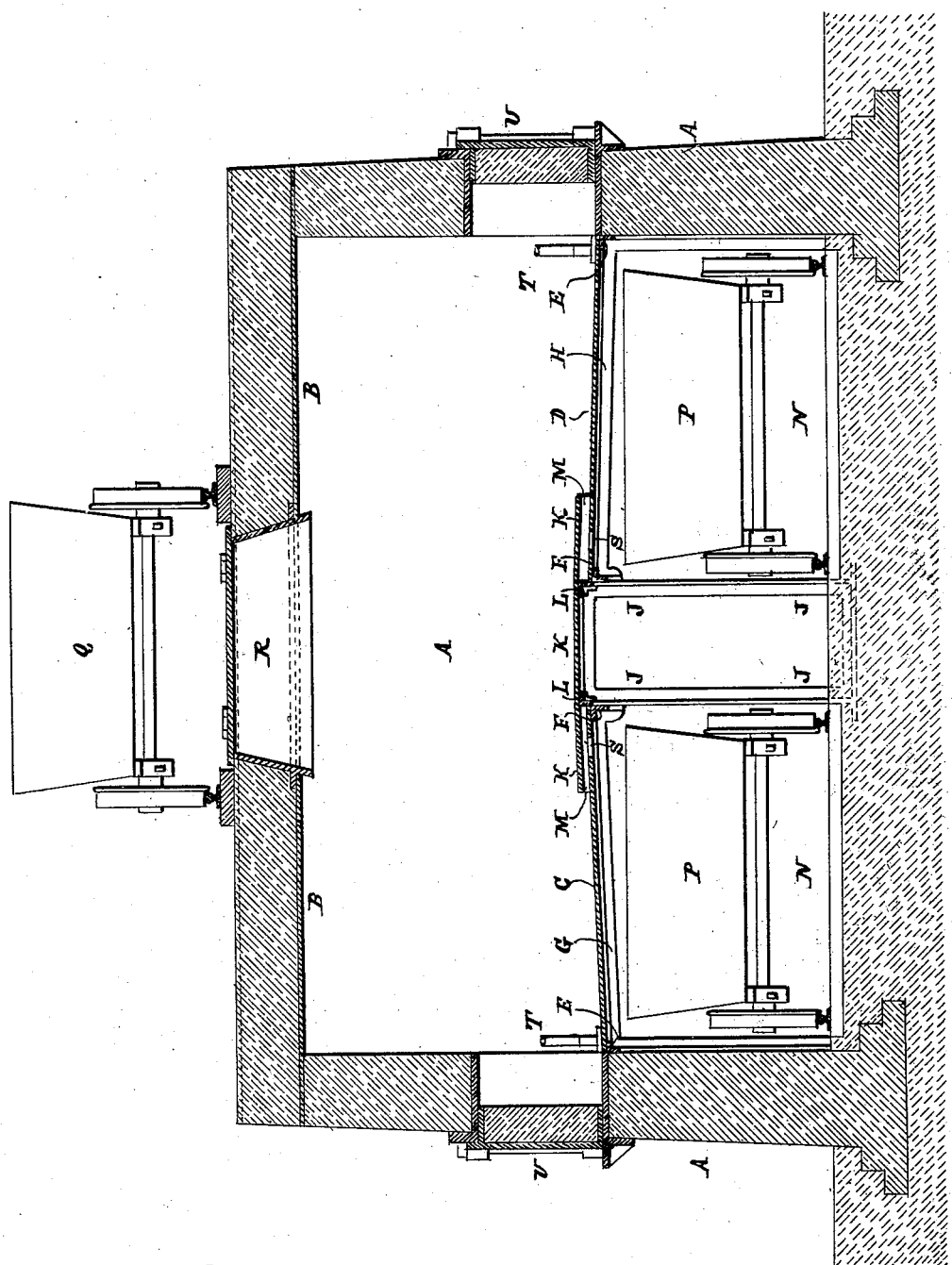
WITNESSES:
Geo. Wright
S. C. Connor
INVENTOR
RICHARD BROWN
BY
Howson and Howson
HIS ATTORNEYS

UNITED STATES PATENT OFFICE.

RICHARD BROWN, OF SOUTHAMPTON, ENGLAND.

UTILIZING WASTE HEAT IN CONNECTION WITH SMELTING-FURNACES.

SPECIFICATION forming part of Letters Patent No. 708,018, dated September 2, 1902.

Application filed April 12, 1902. Serial No. 102,586. (No model.)

*To all whom it may concern:*

Be it known that I, RICHARD BROWN, a subject of the King of Great Britain and Ireland, and a resident of Southampton, in the county of Hants, England, (whose postal address is Highfield Mansions, Southampton, Hants, England,) have invented certain new and useful Improvements in Utilizing Waste Heat in Connection with Smelting-Furnaces, (for which I have applied for British Patent No. 18,772, dated September 20, 1901,) of which the following is a specification.

My said invention has for its object to utilize waste heat in connection with smelting-furnaces—such, for instance, as are used for smelting ores for the production of cast-iron—by providing improved means whereby the heat from both the hot slag run off from the furnaces and from the iron itself immediately after it has been cast into "pigs" (which heat in both cases has hitherto been allowed to go to waste) can be utilized to drive off the moisture which may be in the ores or coke or other material for the furnace before such ores or the like are charged into the furnace, this moisture being objectionable and adding to the cost in the smelting operations.

The apparatus used in carrying out my invention may be constructed in various ways; but, by way of example, I append a sheet of drawings, to be hereinafter referred to in describing my improvements and showing a transverse vertical section of a simple arrangement of the apparatus.

In carrying out my invention, instead of storing the ores or the like for the smelting-furnace in the open I provide a covered shed or chamber A, of a length and breadth to suit the space available, this chamber being constructed of any suitable material, but preferably having the insides of fire-brick and the roof of steel plates B, carried by transverse beams and covered with brick or other material. The floor of this chamber consists of plates C D of metal or other suitable material, supported at each edge by longitudinal angle-iron bars E F and by angle-iron beams G H, extending from the walls of the chamber A to a number of central iron standards J. The iron standards J are covered by central plates K, carried by angle-irons L and distance-pieces M, placed at intervals between the plates K and C D. This construction of floor thus forms two flues N, each of dimensions sufficient to allow iron bogies P to be passed into and through such flues N, as hereinafter described.

Instead of two flues N the chamber A may be of a breadth suitable for only one flue or for more than two flues, the floor-plates being arranged and carried to suit.

The ores or other materials for the smelting-furnace and which are to be dried are filled into trucks Q, which are run up an incline at the end of the chamber A onto the top of the chamber and discharged into the chamber through hoppers R, arranged at intervals in the roof, or the chamber A may be filled as required by a movable elevator or steam-navvy or the like running on rails parallel to the chamber, the ore being laid down parallel to the chamber, or the ore may be lifted out of the trucks in which it is brought to the furnaces by a suitable steam-navvy or the like and put into the chamber direct.

The slag is run from the furnaces into the iron bogies P, or the hot pig-iron immediately after it is set in the molds is placed in bogies, and these bogies are run into the flues N, being attached to a chain or wire rope passing through the flues and pulled by any suitable power. The waste heat in such slag or in such pig-iron acting through the floor-plates C D K can thus be utilized for the purpose of driving off the whole or a part of the moisture in the ores or other materials stored on such plates. The moisture driven off may be allowed to escape by partially opening a number of the doors of the hoppers R, or special ventilating-pipes may be fitted in the roof of the chamber A. The flues N are connected together by the passages between the central standards J, and dampers or end doors (not shown) are provided to prevent the free access of the external air to the flues. Openings S are formed at intervals through the floor-plates C D, so that a portion of the heated air will pass into the space between the plates C, D, and K and from this space ascend up through the ores or other materials on the floor, and vent-pipes T may also be provided at intervals along the outer edges of the plates C D for the same purpose. Hinged or other doors U, preferably lined with fire-brick, are provided at intervals in the side walls of the chamber, through which doors the dried ore or the like can be drawn as required, and in some cases the chamber may also be filled through these doors. When the slag or pig-iron has given up its heat, as described, the bogies are pulled out of the flues N.

An additional galvanized or other roof may be carried above the chamber if thought desirable.

What I claim as my invention is—

Apparatus for utilizing waste heat in connection with smelting-furnaces, comprising a covered chamber to receive the materials for the furnace, having a floor and supported so as to form flues to receive bogies containing hot products from the furnace, the floor having openings adapted to allow air heated by contact with the hot products to ascend through the materials thereon, substantially as described.

In testimony whereof I have signed my name to this specification in the presence of two subscribing witnesses.

RICHARD BROWN.

Witnesses:
JOHN E. HOPLEY,
CECIL G. ANGELL.